United States Patent [19]

Perry

[11] Patent Number: 4,664,600
[45] Date of Patent: May 12, 1987

[54] ROTOR AEROFOIL BLADE CONTAINMENT
[75] Inventor: Derick A. Perry, Derby, England
[73] Assignee: Rolls-Royce plc, London, England
[21] Appl. No.: 797,018
[22] Filed: Nov. 12, 1985
[30] Foreign Application Priority Data
Nov. 20, 1984 [GB] United Kingdom ............... 8429275
[51] Int. Cl.⁴ .............................................. B64C 3/26
[52] U.S. Cl. .................................................. 416/224
[58] Field of Search ............... 416/224, 229 R, 229 A, 416/230, 232, 223 R

[56] References Cited

U.S. PATENT DOCUMENTS

| | | | |
|---|---|---|---|
| 2,929,755 | 3/1960 | Porter | 416/230 |
| 3,330,550 | 7/1967 | Brownlee | 416/223 |
| 3,664,764 | 5/1972 | Davis et al. | 416/230 |
| 4,037,990 | 7/1977 | Harris | 416/230 |
| 4,302,155 | 11/1981 | Grimes et al. | 416/230 |
| 4,407,635 | 10/1983 | Grimes et al. | 416/230 |
| 4,524,499 | 6/1985 | Grimes et al. | 416/230 |

FOREIGN PATENT DOCUMENTS

| | | |
|---|---|---|
| 1302857 | 1/1973 | United Kingdom . |
| 1437236 | 5/1976 | United Kingdom . |
| 1539634 | 1/1979 | United Kingdom . |
| 2082964-A | 3/1982 | United Kingdom . |

Primary Examiner—Robert E. Garrett
Assistant Examiner—John Kwon
Attorney, Agent, or Firm—Cushman, Darby & Cushman

[57] ABSTRACT

A hollow prop-fan aerofoil blade is covered by a woven containment sheath which is bonded to the aerofoil surface of the blade and operationally anchored to the blade root. The sheath is arranged to be of sufficient strength to contain any of the aerofoil cross-section portion of the blade in the event of any structural failure thereof.

10 Claims, 3 Drawing Figures

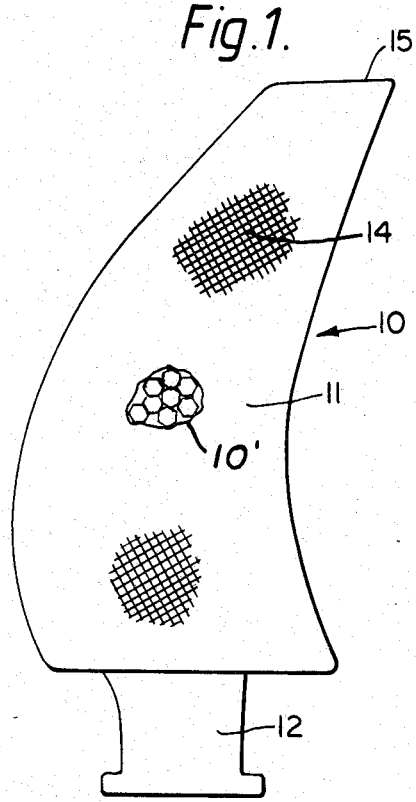
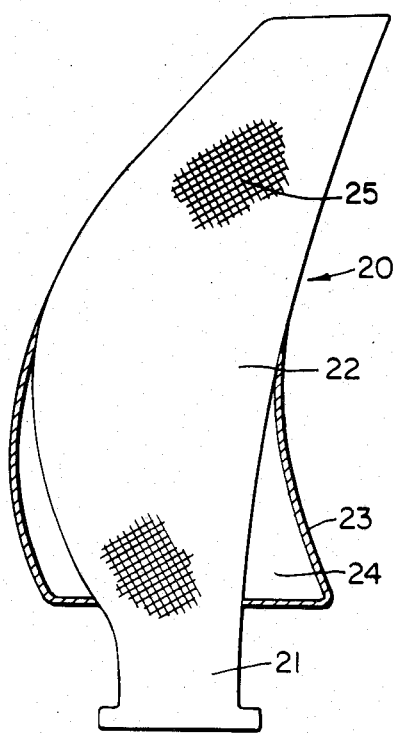
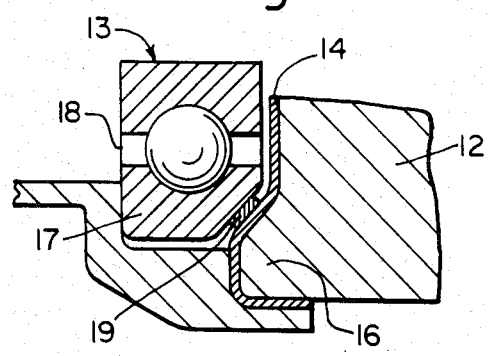

ROTOR AEROFOIL BLADE CONTAINMENT

This invention relates to rotor aerofoil blades and in particular to the containment of rotor aerofoil blades in the event of a structural failure thereof.

Rotor aerofoil blades, such as fan blades for ducted fan gas turbine engines and propeller blades for piston engines and turboprop gas turbine engines, are conventionally solid structures. This brings advantages in terms of blade integrity and cost but is not conducive with weight reduction and consequent improvements in operating efficient. The quest for weight reduction had led to an interest in hollow aerofoil blades. Particular interest has been expressed in hollow fan blades and the so-called propfan blades for use respectively in the ducted and non-ducted fans of gas turbine engines. While hollow aerofoil blades provide a desirable decrease in weight, they also provide integrity problems. In the event of the failure of a hollow aerofoil blade through, for instance, impact by a bird or other foreign object, there is a great danger of part or all of the blade becoming detached from its mounting structure and causing damage to surrounding structures. If the aerofoil blade is in the form of a fan blade for a ducted fan gas turbine engine, detached blade portions can be contained by the casing which surrounds the fan. However the casing must be sufficiently strong to serve this purpose and is consequently generally heavier than it would need to be if it did not provide containment. Moreover the casing would not protect the engine itself from the effects of a detached blade portion passing into it. The situation with propellers blades and propfan blades is even more serious in view of the lack of a surrounding containment structure.

It is an object of the present invention to provide a rotor aerofoil blade which has improved integrity and which therefore is less of a hazard to surrounding structure in the event of a structural failure thereof.

According to the present invention, a rotor aerofoil blade comprises an aerofoil cross-section portion having a tip portion and a root portion at the opposite end thereof to said tip portion, for the attachment of said blade to a rotatable hub member, at least said tip portion of said aerofoil cross-section portion being enclosed by a containment sheath formed from fibrous material, said containment sheath being bonded to the surface of said aerofoil cross-section portion, operationally anchored to said root portion and of sufficient strength to contain any of said aerofoil cross-section portion enclosed thereby in the event of any structural failure of said aerofoil cross-section portion.

The invention will now be described, by way of example, with reference to the accompanying drawings in which:

FIG. 1 is a side view of a rotor aerofoil blade in accordance with the present invention.

FIG. 2 is an enlarged sectional view of a part of the root portion of the rotor aerofoil blade shown in FIG. 1 and a part of the rotatable hub member to which it is attached.

FIG. 3 is a partially sectioned side view of an alternative form of rotor aerofoil blade in accordance with the present invention.

With reference to FIG. 1 a hollow rotor aerofoil blade generally indicated at 10 contains a honeycomb support structure 10' and comprises an aerofoil cross-section portion 11 and a root portion 12 for the attachment of the rotor aerofoil blade 10 to a rotatable hub member, part of which 13 can be seen in FIG. 2. The rotor aerofoil blade 10 is in the form of a propfan blade but it will be appreciated that the present invention is not specifically restricted to propfan blades but is equally applicable to aerofoil blades such as fan blades and propeller blades whether hollow or not.

The whole of the external surface of the aerofoil blade 10 is enclosed within a sheath 14 of woven aramid fibres which are available under the trade name "Kevlar" from Du Pont. In the interests of clarity, only portions of the sheath 14 are depicted in FIG. 1. The sheath 14 is of an open weave fabric in order that the sheath 14 may readily conform to the configuration of the aerofoil blade 10. Thus although the warp and weft fibres of the sheath 14 are initially woven so as to be perpendicular to each other, they move relative to each other to adopt other angular dispositions as the sheath 14 is drawn on to the aerofoil blade 10 so as to compensate for variations in the blade 10 configuration.

The sheath 14 is closed at the end which engages the tip 15 of the aerofoil blade 10 while the opposite open end thereof terminates at the blade root 12. The sheath 14 only partially encloses the blade root 12 as can be seen more clearly in FIG. 2. More specifically it extends over the enlarged retention feature 16 of the blade root 12 so as to be interposed between the retention feature 16 and the radially inner race 17 of the bearing 18 which constitutes a part of the rotatable hub member 13 which carries the aerofoil blade 10, together with a plurality of similar aerofoil blades. A ring 19 acts as a load transference member between the sheath 14 and the inner bearing race 17. It will be seen therefore that the rotatable hub member 13, in addition to retaining the blade root 12, serves to clamp the sheath 14 in position on the root 12, thereby anchoring the sheath 14 to the blade root 12.

In order to eliminate any possible fretting between the sheath 14 and the aerofoil cross-section portion 11 of the blade 10, a resin is used to bond the two together. An epoxy resin is particularly suitable for this purpose although other resins could be utilised if so desired.

During normal operation of the aerofoil blade 10 as one of an array of similar rotating aerofoil blades, the sheath 14 is essentially passive so far as performing a load bearing function is concerned. However, it does perform the useful effects of protecting the blade 10 from minor foreign object damage and erosion, provides torsional stiffness to the blade 10, reduces the rate of crack propagation within the blade 10 and provides elastic damping of high cycle blade vibration. The major role of the sheath 14 comes about in the event of any structural failure of the aerofoil cross-section portion 11 of the blade 10. If such structural failure results in one or more pieces of the aerofoil cross-section portion 11 becoming detached from the remainder of the aerofoil blade 10, the sheath 14 serves to contain the detached piece or pieces and thereby prevent damage to surrounding structures.

The aerofoil blade 10 is primarily intended for use in a propfan mounted on the front of a gas turbine engine. Propfans can, however, be located towards the rear of a gas turbine engine and as such are subject, at least in part, to impingement by the hot exhaust gas efflux from the engine. The temperatures that these exhaust gases reach in practice are so high as to cause thermal degradation of the sheath 14 and the resin used to bond it to the aerofoil cross-section portion 11 of the blade 10. In such circumstances it is necessary to provide shielding of those areas of the aerofoil blade 10 which are liable to encounter high temperature exhaust gases. In FIG. 3 there is depicted an aerofoil blade 10 in accordance with the present invention which is provided with such shielding.

The aerofoil blade 20 is, like the aerofoil blade 10, provided with a root 21 for the attachment of the blade 20 to the rotatable hub member 13. However unlike the aerofoil blade 10, the aerofoil cross-section portion 22 of the aerofoil blade 20 adjacent its root 21 is partially defined by an appropriately configured metallic shield 23. The shield 23 is mostly spaced apart from the remainder of the blade 20 so that a gap 24 is defined between them. The gap 24, which may be fed with cooling air, acts as a thermal insulation layer between the hot exhaust efflux gases of the engine upon which the blade 20 is mounted and those portions of the blade 20 which are prone to thermal degradation. The blade 20 is otherwise similar in construction to the previously described aerofoil blade 10 and that it is hollow and covered by a containment sheath 25 which is, in operation, anchored to the blade root portion 21. However that portion of the aerofoil cross-section blade portion 22 which is enclosed by the metal shield 23, since it is not directly exposed to the airstream passing over the aerofoil blade 20, is narrower than the corresponding portion of the aerofoil blade 10 in order to define the gap 24.

It is envisaged that it may be desirable in certain circumstances to additionally provide a thin metal sheath around the blade root portions 12 and 21 over the containment sheath 14 or 25. Such a metal sheath would protect the sheath bonding in the region of the root portions 12 and 21 from thermal degradation as well as providing an improved load path for the sheath 14 or 25 and protect the root portions 12 and 21 from foreign object damage.

Although the present invention has been described with reference to rotor aerofoil blades having sheaths formed from woven aramid fibres, alternative fibres or even wire could be utilised if desired. Precautions would have to be taken in choosing alternative fibres in order to ensure that they are of sufficient strength to contain any detached aerofoil blade portion. Moreover it is envisaged that the fibres which make up the sheath 14 could be wound directly on to the aerofoil cross-section portion 11 of the blade 10 instead of being woven into a sheath 14 beforehand.

I claim:

1. A rotor assembly comprising:
   a rotatable hub member;
   a plurality of hollow airfoil blades attached to said hub member, each of said hollow blades including an airfoil cross-section portion with an outer surface and having a tip portion at one end and a root portion at an opposite end thereof to said tip portion for attachment to said rotatable hub member;
   and containment means for each of said hollow blades, each of said containment means including a containment sheath formed from a fibrous material, said containment sheath having a closed end for enclosing said tip portion of said hollow blade, said containment sheath further enclosing and being bonded to said outer surface of said airfoil cross-section portion of said hollow blade and anchored to said root portion, said containment sheath having sufficient strength to contain any part of said airfoil cross-section portion enclosed thereby in the event of any structural failure of said airfoil cross-section portion, and said containment sheath being essentially a non-load bearing and passive member during normal operation of said rotor assembly.

2. A hollow rotor assembly as claimed in claim 1 wherein said containment sheath is formed from fibrous material which is woven in the form of an open weave fabric.

3. A hollow rotor assembly as claimed in claim 1 wherein said containment sheath is operationally anchored to said root portion by arranging for a portion of said sheath to extend to said root portion and clamping said extended sheath portion between said root portion and the rotatable hub member to which said root portion is operationally attached.

4. A hollow rotor assembly as claimed in claim 1 wherein at least part of said aerofoil cross-section portion adjacent said root portion is constituted by a metal shield, at least a part of which shield is thermally insulated from the remainder of said blade.

5. A hollow rotor assembly as claimed in claim 4 wherein said at least part of said metal shield is thermally insulated from the remainder of said blade by air.

6. A hollow rotor assembly as claimed in claim 1 wherein said fibres are formed from an aramid.

7. A hollow rotor assembly as claimed in claim 1 wherein said containment sheath is bonded to the surface of said at least part of said aerofoil cross-section portion which it encloses by a resin.

8. A hollow rotor assembly as claimed in claim 7 wherein said resin is an epoxy.

9. A hollow rotor assembly as claimed in claim 1 wherein said blade is a prop-fan blade.

10. A hollow rotor assembly as claimed in claim 1 wherein said hollow blade contains a honeycomb support structure.

* * * * *